(12) United States Patent
Naess et al.

(10) Patent No.: US 9,732,981 B2
(45) Date of Patent: Aug. 15, 2017

(54) METHOD AND EQUIPMENT FOR HEAT RECOVERY

(71) Applicants: NORSK HYDRO ASA, Oslo (NO); NTNU TECHNOLOGY TRANSFER AS, Trondheim (NO)

(72) Inventors: Erling Naess, Ranheim (NO); Otto Kristian Sonju, Trondheim (NO); Torbjorn Slungaard, Stjordal (NO); Bjorn Petter Moxnes, Ovre Ardal (NO)

(73) Assignees: NORSK HYDRO ASA, Oslo (NO); NTNU TECHNOLOGY TRANSFER AS, Trondheim (NO)

( * ) Notice: Subject to any disclaimer, the term of this patent is extended or adjusted under 35 U.S.C. 154(b) by 0 days.

(21) Appl. No.: 14/088,942

(22) Filed: Nov. 25, 2013

(65) Prior Publication Data

US 2014/0069625 A1 Mar. 13, 2014

Related U.S. Application Data

(62) Division of application No. 11/658,087, filed as application No. PCT/NO2005/000262 on Jul. 15, 2005, now abandoned.

(30) Foreign Application Priority Data

Jul. 23, 2004 (NO) .................................. 20043150

(51) Int. Cl.
*B01D 50/00* (2006.01)
*B01D 59/50* (2006.01)
(Continued)

(52) U.S. Cl.
CPC ................. *F24H 8/00* (2013.01); *C25C 3/22* (2013.01); *F27D 17/00* (2013.01); *F28F 1/02* (2013.01);
(Continued)

(58) Field of Classification Search
CPC ............... F01N 2240/02; F01N 3/0205; F28D 21/0003; F01M 25/0737; F01M 25/0736
(Continued)

(56) References Cited

U.S. PATENT DOCUMENTS 1,585,754 A   5/1926 Bonus et al.
2,462,136 A * 2/1949 Smith ........................... 165/148
(Continued)

FOREIGN PATENT DOCUMENTS

DE    1 085 889       7/1960
DE    198 45 258      3/2000
(Continued)

OTHER PUBLICATIONS

Russian Office Action (with English translation) issued Jan. 12, 2009 in corresponding Russian Patent Application No. 2007106895/02(007471).
(Continued)

*Primary Examiner* — Amber R Orlando
(74) *Attorney, Agent, or Firm* — Wenderoth, Lind & Ponack, L.L.P.

(57) ABSTRACT

The present invention relates to a method and equipment for recovering heat from exhaust gas removed from an industrial process, such as an electrolysis process for the production of aluminum. Heat is recovered by means of an extraction/suction system, where the exhaust gas contains dust and/or particles. The heat is recovered as the exhaust gas being brought into contact with heat-recovery elements. Flow conditions and the design of the heat recovery elements are such that the deposits of the dust and/or particles on the surfaces stated are kept at a stable, limited level. In preferred embodiments, the heat-recovery elements have a circular or an extended, elliptical cross-section and may be equipped with fins or ribs.

8 Claims, 3 Drawing Sheets

(51) Int. Cl.
*F24H 8/00* (2006.01)
*C25C 3/22* (2006.01)
*F27D 17/00* (2006.01)
*F28F 1/02* (2006.01)
*F28F 1/30* (2006.01)
*F28D 21/00* (2006.01)

(52) U.S. Cl.
CPC ............ *F28F 1/30* (2013.01); *F28D 21/0003* (2013.01); *Y02B 30/102* (2013.01); *Y02P 10/262* (2015.11); *Y02P 10/265* (2015.11); *Y02P 10/283* (2015.11)

(58) Field of Classification Search
USPC ........................................................ 55/385.1
See application file for complete search history.

(56) References Cited

U.S. PATENT DOCUMENTS

| | | | |
|---|---|---|---|
| 3,752,226 A | | 8/1973 | Bullock |
| 4,099,019 A | * | 7/1978 | Horibe et al. ............... 373/9 |
| 4,141,702 A | * | 2/1979 | deVries ..................... 95/225 |
| 4,265,301 A | * | 5/1981 | Anderson ................ 165/162 |
| 4,270,493 A | | 6/1981 | Blaskowski |
| 4,339,249 A | | 7/1982 | Berkestad et al. |
| 4,482,363 A | | 11/1984 | Mink |
| 4,526,112 A | * | 7/1985 | Warner .................... 110/345 |
| 4,562,053 A | * | 12/1985 | Andersson ................ 423/235 |
| 4,976,310 A | * | 12/1990 | Jabs ........................... 165/82 |
| 5,108,469 A | * | 4/1992 | Christ ........................ 95/214 |
| 5,178,210 A | * | 1/1993 | Guillet et al. ............ 165/111 |
| 5,277,358 A | * | 1/1994 | Cottone et al. ........... 228/219 |
| 5,318,102 A | * | 6/1994 | Spokoyny et al. .......... 165/10 |
| 5,368,096 A | * | 11/1994 | Williams .................. 165/113 |
| 5,603,909 A | * | 2/1997 | Varner et al. ............ 423/239.1 |
| 5,676,715 A | * | 10/1997 | Kalka et al. ................. 96/228 |
| 5,799,725 A | | 9/1998 | Bradley et al. |
| 6,070,655 A | * | 6/2000 | Heikkila ................... 165/111 |
| 6,240,725 B1 | * | 6/2001 | Scappatura ................. 60/311 |
| 6,273,940 B1 | * | 8/2001 | Bielawski et al. .......... 95/228 |
| 6,496,649 B2 | * | 12/2002 | De Stoutz ................. 392/478 |
| 2002/0131921 A1 | * | 9/2002 | Ishikawa .................. 422/198 |
| 2003/0178185 A1 | | 9/2003 | Wanni et al. |
| 2003/0178187 A1 | | 9/2003 | Wanni et al. |
| 2003/0196781 A1 | | 10/2003 | Wanni et al. |
| 2006/0237305 A1 | * | 10/2006 | Siljan ..................... 204/243.1 |
| 2007/0017811 A1 | | 1/2007 | Waskaas |
| 2008/0011464 A1 | * | 1/2008 | Oofune et al. ............ 165/157 |
| 2009/0235587 A1 | * | 9/2009 | Hawkes et al. ............. 48/202 |
| 2011/0226222 A1 | * | 9/2011 | Raduenz et al. ........ 123/568.12 |
| 2011/0271661 A1 | * | 11/2011 | Knafl et al. ................ 60/287 |
| 2012/0305847 A1 | * | 12/2012 | Von Kossak-Glowczewski .. 252/372 |

FOREIGN PATENT DOCUMENTS

| | | |
|---|---|---|
| GB | 2 209 586 | 5/1989 |
| JP | 59-183297 | 10/1984 |
| JP | 2001-263603 | 9/2001 |
| NO | WO2004083489 | * 3/2004 |

OTHER PUBLICATIONS

International Search Report issued Dec. 1, 2005 in International Application No. PCT/NO2005/000262.

* cited by examiner

METHOD AND EQUIPMENT FOR HEAT RECOVERY

The present application is a divisional of U.S. patent application Ser. No. 11/658,087, filed Jan. 22, 2007, the entirety of which is incorporated herein by reference. The parent application is a national stage application of PCT/NO05/00262, filed Jul. 15, 2005.

BACKGROUND OF THE INVENTION (1) Field of the Invention

The present invention concerns a method and equipment for heat recovery from exhaust gas from a process plant, for instance raw-gas from an electrolysis plant for the production of aluminium. Such exhaust gas may, before it is cleaned, contain dust and/or particles that will form deposits on the heat recovery equipment and thus reduce the efficiency of the heat recovery to an undesired, low level.

(2) Description of Related Art

Various industrial processes produce exhaust gases that can be contaminated by particles, dust and other species that can cause fouling in energy recovery equipment. Such fouling will result in reduced efficiency, and will require extensive maintenance such as cleaning of the surfaces exposed to the gas flow. Thus, energy recovery units are placed downstream a gas cleaning plant, after the gas has been cleaned. With respect to optimising the energy recovery, it is of interest to arrange the recovery units as close to the industrial process as possible, where the energy content in the exhaust gas is at its maximum. This implies that the energy recovery units have to be arranged upstream the gas cleaning plant, because such plants are often localized relatively distant to the industrial process.

U.S. Pat. No. 4,339,249 discloses a heat exchanger for recovery of heat energy from dust containing waste gases. The exchanger is constructed to recover much of the dust entrained in the gases and includes a hollow duct through which the waste gases pass, and which contains first and second tube bundles arranged one after the other and a dust collection surface between them. The heat content in the waste gases is transferred to water passing through the two tube bundles and dust is deposited on the dust collection surface. The tubes in the bundles are arranged in a serpentine configuration, and the first bundle is constructed of a smooth surface tube arranged to remove heat from the dust containing gases upstream the dust collection surface. Thus, when the gases reach the finned tube bundle, it is stated in the publication that no deposition (and clogging) of the narrow spaces between the fins will occur. Thus from this citation it is learned that the dust containing gases should be treated in a first cooling step and then in a separating step before it is entered into the section comprising a second finned tube bundle of a flanged tube (or tubes).

For example, exhaust gas from aluminium electrolysis furnaces contains large amounts of energy at a relatively low temperature level. This energy is currently utilized only to a small extent, but it can be used for heating purposes, process purposes and power production if technically and economically acceptable solutions for heat recovery are established. The temperature level achieved in the heated fluid is decisive to the value and usefulness of the recovered thermal energy. The heat should therefore be extracted from the exhaust gas at as high an exhaust gas temperature as possible. Other examples of industrial processes that produce large exhaust gas volumes containing dust/particles are: Ferro-, alloy- and other smelting plant industries that typically operates with dust-containing exhaust gases at 300° C. and higher, and the low temperature section in waste incineration (i.e. economizer and air preheating sections) that typically operate at 300° C. and lower.

The exhaust gas from electrolysis furnaces is transported through a suction system by means of fans, and the power consumption of the fans depends on the volume flow of exhaust gas and the pressure drop in the system. The power consumption can be reduced by a reduction of these quantities. Cooling the exhaust gas will contribute to reduced volume flow rate and pressure drop, with reduced fan power as a consequence. The largest reduction in pressure drop is achieved by cooling the exhaust gas as close to the aluminium cells as possible.

When improving or scaling-up an industrial process, for instance increased current (amperage) in relation to a given cell-design in a aluminium electrolysis plant, the raw-gas temperature and thus its pressure inside the superstructure will increase as there will be more heat present above the top of the cell. This can result in cell puncture, i.e. the same level of pressure will be present at the inside as that of the outside of the cell. By such puncturing, the emission of process gases to the production hall will increase.

This problem can be solved in three ways:

Enchange the encapsulation at the cell top, which can be difficult in practice.

Increase the suction by installing higher fan capacity. To avoid large pressure drop in the raw gas channels, these must be increased in size as well. The gas cleaning plant will have to be re-designed to avoid reduced efficiency or overloading components in the gas cleaning process. In total this solution will be expensive with regard to both investment and operation costs.

Cooling of the raw gas upstream the fans together with heat recovery, a solution that will reduce both the raw gas volume flow rate and the pressure drop in channel system and gas cleaning plant. The suction can thereby be increased without the need of changing the dimensions of channels and gas cleaning plant.

BRIEF SUMMARY OF THE INVENTION

The present invention can be utilised in accordance with the last mentioned technical solution, which will be the most economical one as the heat removed from the raw gas can be utilised in other processes or applications.

The process is here exemplified by a plant for aluminium production, and is characterised in that large amount of exhaust gas (in the order of 5000 Nm$^3$/h per aluminium cell) containing low-temperature energy (typically approximately 120-140° C., but can be increased up to approximately 200° C.) being extracted/sucked from the aluminium cells. The exhaust gas contains pollutants such as particles and gaseous components, which must be removed from the exhaust gas in a cleaning process before it can be emitted.

The energy content of the exhaust gas can be recovered in a heat exchanger (heat recovery system) in which the exhaust gas gives off heat (is cooled) to another fluid suitable for the application in question. In principle, the heat recovery system can be located upstream of the cleaning process—where the heat recovery system must operate with a gas containing particles downstream of the cleaning process—where polluted components and particles in the gas have been removed.

As the cleaning processes available today must operate at a low temperature level, energy recovery is, in practice, relevant only for the alternative where the heat recovery system is located upstream of the cleaning process. This means, in practice, that the heat recovery system must be able to operate with hot gas containing particles.

On account of forces of inertia, diffusion and poresis, particles and trace components in the exhaust gas will be deposited on the heat-transfer surface of the heat recovery system and form an insulating layer that reduces the heat transfer. Without sufficient control, the effectiveness (the level of heat recovery) of the heat recovery system will be unacceptably low, and the pressure drop (and the associated work to pump the exhaust gas through) will be large. The thickness of the deposited coating can be controlled using active or passive techniques.

Active techniques mean that the deposit is removed fully or partially by means of mechanical sweeping, hydraulic or pneumatic flushing/washing, impact or impulse sweeping or equivalent methods.

Passive techniques mean that no form of external equipment or appliance is used to control the particle deposit. It is instead controlled and limited by means of process parameters, for example the velocity of the exhaust gas.

The present invention includes a passive technique for limiting the deposit in the heat recovery system.

In addition to the heat recovery system recovering heat from the exhaust gas, it is necessary for this to be done without the pressure drop for the exhaust gas through the heat recovery system being too large. Fans are used to drive the exhaust gas through the system, and the energy that must be supplied to the fans is approximately proportional to the pressure drop and volume rate. It is therefore important for the heat recovery system to be designed in such a way that the pressure drop is as low as possible.

Reducing the volume flow rate produces a gain in the form of lower power consumption for the fans that drive the exhaust gas through the system. A smaller volume flow rate can be achieved by means of
 i. reducing the exhaust gas temperature before the fan
 ii. reducing the quantity of exhaust gas extracted from the electrolysis cells.

Reducing the volume flow also reduces the pressure drop in other parts of the system.

A reduction in the volume extracted/sucked from the electrolysis cells will normally not be possible, as it will result in increased pressure within their enclosures. Increased pressure will further make the cells more vulnerable to puncturing, resulting in an increase in gas and dust escaping to the work environment.

Reducing the amount of exhaust gas extracted will generally entail an increase in gas temperature out of the electrolysis cells (which reduces the gain from the reduced amount of gas) unless the exhaust gas is cooled before the fans. The pressure drop in the system depends on the gas speed, which can be reduced by reducing the gas temperature. The proposed solution entails a net reduction in power consumption for the fans precisely because the exhaust gas is cooled. In addition, the heat recovered from the exhaust gas is available as process heat for various heating and processing purposes.

The proposed solution will, for new plants, allow for smaller dimensions in gas cleaning plants inclusive their transport channels, because the exhaust gas volumes to be transported will be reduced.

It is desirable (but not necessary) to have a heat recovery system that is relatively compact, i.e. that has minimum volume. This is to reduce the footprint and costs.

Purpose

The purpose of the present invention is to recover heat from exhaust gas containing dust/particles from industrial processes, in particular aluminium cells, in one or more heat recovery systems located upstream of the gas cleaning process by using a passive technique to keep the coating deposits on the heat-recovery surfaces under control and to achieve stable operation.

By cooling the raw gas from an electrolysis plant for production of aluminium, it is possible to keep the gas pressure inside the enclosures of the cells at a sufficient low level to avoid increased effluent of gas and dust to the ambient air.

These and other advantages can be achieved with the invention as it is defined in the attached claims.

BRIEF DESCRIPTION OF THE DRAWINGS

The present invention will be described in further detail in the following using examples and figures, where.

DETAILED DESCRIPTION OF THE INVENTION

Figure 4:
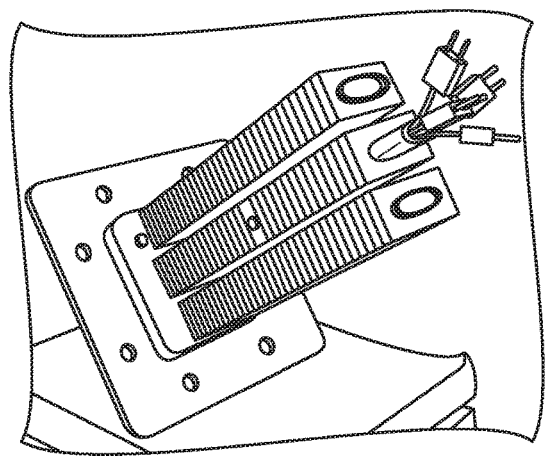
FIG. 4 shows test equipment for a heat recovery system embodiment with elliptical, finned tubes.
Figure 5:
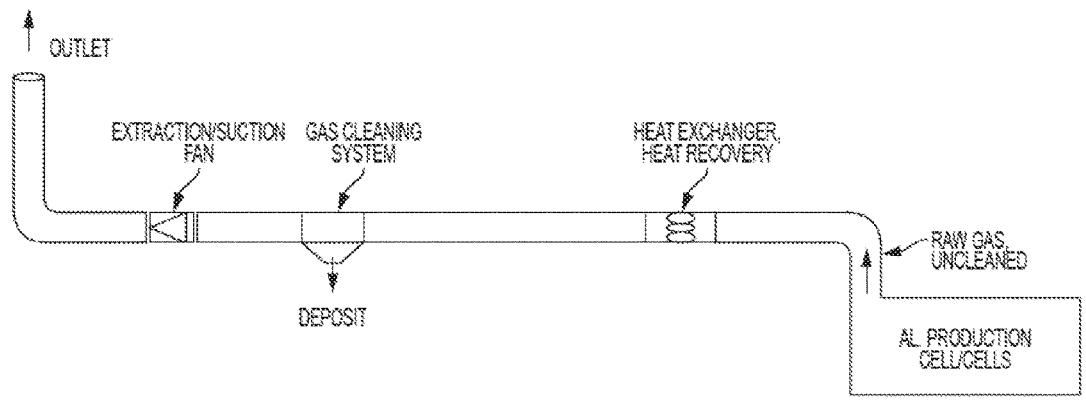
FIG. 5 shows an embodiment of the equipment used in the method for recovering heat from an exhaust gas.

The heat recovery system may consist of one or more hollow elements such as tubes with a circular or elliptical/oval cross-section, with or without fins fitted on the outside of the tubes, see FIG. 4. The tubes may be made of carbon steel that has been treated in a galvanisation process. Other materials may also be relevant for this application, such as aluminium. The external surfaces of the tubes that will be in contact with particles/dust may also be treated in accordance with relevant surface treatment techniques to produce an increased slip effect. Relevant slip coatings may also be included in such treatment techniques.

The exhaust gas flows on the outside of the tubes and perpendicular to the axial direction of the tubes. The tubes are packed in a regular pattern with the center-to-center tube distance adjusted so that the mass flux (mass flow rate per unit of flow cross-section) and momentum of the exhaust gas are kept at a level at which a balance is achieved between particle deposition and particle removal on the heat-transferring surfaces. The heat recovery system is enclosed by side walls and thus forms a channel through which the exhaust gas flows. No special requirements are made for the coolant that flows inside the tubes. For example, the coolant may consist of liquid/steam or gas such as water/steam or air.

To achieve a balance between particle deposition and particle removal, there must be a certain minimum mass flux and momentum for the exhaust gas. This threshold is both geometry-specific and process-specific. Tests are carried out to identify the threshold value for some specific geometries (Ø36 mm circular tubes, Ø36 mm circular tubes with Ø72 mm annular fins, 14×36 mm elliptical tubes with rectangular fins) in a small-scale test setup. In the test, real exhaust gas from aluminium production is used, with particle concentration and particle distribution typical for this process.

The net particle/dust deposition on the heat transfer surfaces is controlled by the transport of particles/dust to the surface, adhesion at the surface and entrainment/removal from said surface. The transport to the surfaces is influenced by the concentration of particles in the gas, together with convection, diffusion, and phoresis for small particles, while momentum forces and inertia forces are more dominant for larger particles. The adhesion to the surface is influenced among other effects by van der Waal bonding forces, capillary forces, phoresis, and gravity. Entrainment/removal of particles/dust from the surface is influenced by shear forces in the flow, grinding and collisions caused by larger particles that hit the surface, together with gravity forces. A balance between particle deposition and particle entrainment/removal is achieved by the fact that the mechanisms causing the entrainment/removal of particles are augmented to a level that balances the deposition mechanisms. For a given system these mechanisms can be expressed by characteristic gas velocities, whereby various velocities will give corresponding net thickness of the fouling layer. Said layer will insulate against the heat transfer. These characterising gas velocities can in principle be established by theoretical calculations, but will in practice be determined by experiments and measurements, due of the complexity of the issue. An optimised velocity will be a velocity that, for the given system, renders an acceptable reduction in heat transfer caused by fouling at stable conditions, without rendering a too high pressure drop. In the experiments carried out, acceptable raw gas velocities were measured to be approximately 12 meters/second or higher.

Figure 1:
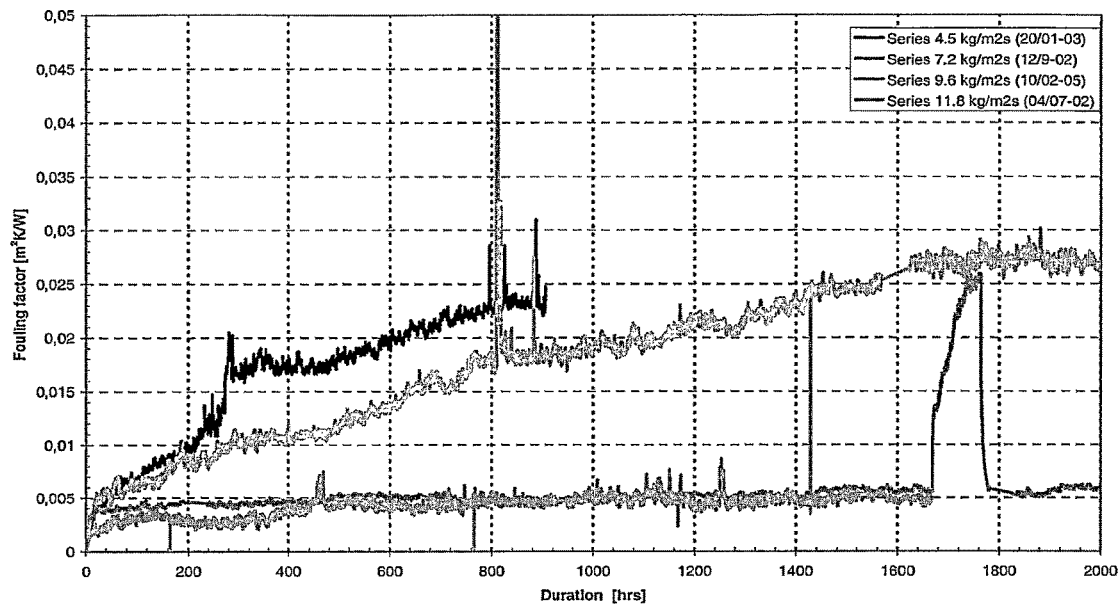
FIG. 1 shows results from tests with elliptical, finned tubes.

The exhaust gas temperature in the tests was approximately 130° C., and the tube wall temperature approximately 70° C. An example of test results is shown in FIG. 1 (elliptical tubes with rectangular fins), where the resistance to heat transfer on account of the deposit layer (fouling factor) is shown as a function of time for various free stream gas mass fluxes. A stable state (no change in the fouling factor) is typically achieved after 50-500 hours of operation at a gas velocity of approximately 11-13 m/s (equivalent to approximately 9.5-11 kg/m$^2$s). [For the tests shown in FIG. 1, stable conditions occurred at a gas velocity of approximately 11 m/s (10 kg/m$^2$s) after approximately 400 hours of operation.]

The reduction in heat transfer under stabilised conditions is compensated for by a moderate increase in the heat-transfer surface, typically 25-40% in relation to a clean heat-transfer surface. At the same time, the pressure drop for the exhaust gas through the heat recovery system is kept at an acceptable level. These goals are achieved via a combination of tube/fin geometry, tube packing and flow conditions.

Figure 2:
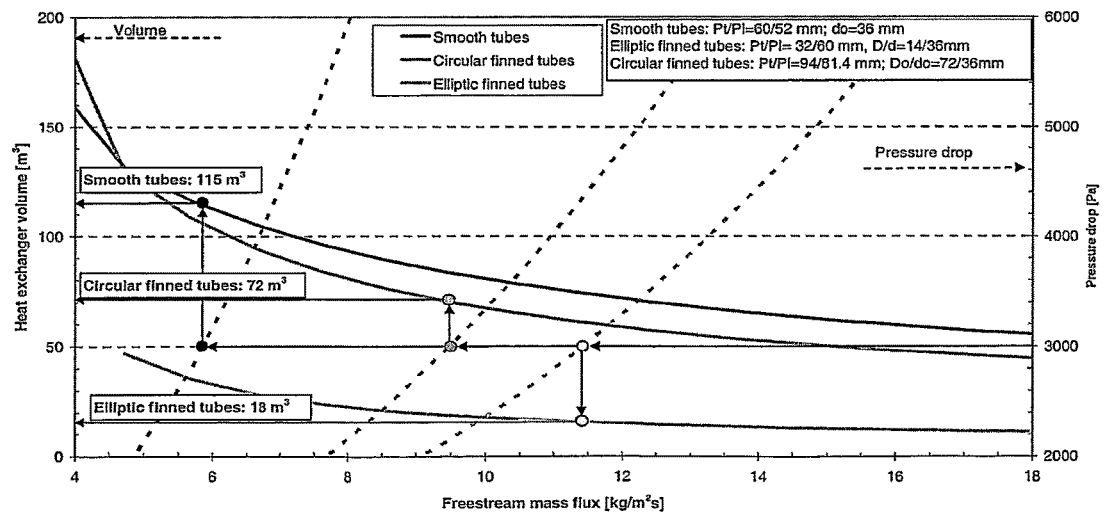
FIG. 2 shows a calculation of the heat exchanger volume for 120° C. inlet temperature to the heat recovery system, 6.5 MW thermal power. Exhaust gas flow rate: 440,000 Nm$^3$/h, inlet temperature to the fan: 80° C. Results for the permitted pressure drop in the heat recovery system of 3000 Pa are indicated.
Figure 3:
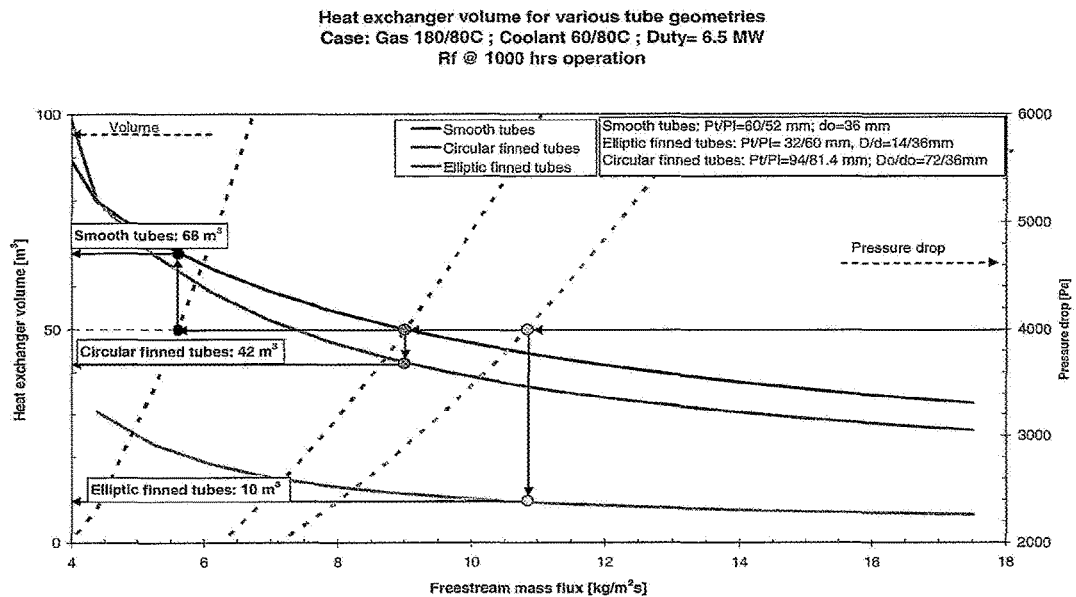
FIG. 3 shows a calculation of the heat exchanger volume for 180° C. inlet temperature to the heat recovery system, 6.5 MW thermal power. Gas flow rate: 176,000 Nm$^3$/h, inlet temperature to the fan: 80° C. Results for the permitted pressure drop in the heat recovery system of 4,000 Pa are indicated.

Examples of dimensioning heat recovery systems for recovery of 6.5 MW heat from exhaust gas at 120° C. and 180° C. are shown in FIG. 2 and FIG. 3. These examples are based on given pressure drop correlations and an assumed total pressure drop in the heat recovery systems equivalent to a power demand in the fans of 10%, respectively 5% of the energy recovered. In these examples, only designs with exhaust gas velocities (the velocity in the open flow cross-section in the heat recovery system) over approximately 11-13 m/s (9.5-11 kg/m$^2$s) will achieve stable conditions. The other designs will experience unacceptably high deposits over time. As the figures show, only elliptical finned tubes will allow a velocity high enough for stable conditions to be achieved at the specific pressure drops.

The relationship between mass flux and momentum for the exhaust gas and stabilised coating resistance (fouling factor) is a function of exhaust gas temperature and composition, plus particle concentration and distribution. At the same time, the pressure drop is a function of tube and fin geometry, tube packing, exhaust gas temperature and speed and total heat-transfer surface. The relationships demonstrated so far are therefore not universal. Whether a heat recovery system can operate with stable coating conditions and acceptable pressure drop depends on the process (temperature level, particle characteristics, requirements for thermal efficiency for the heat recovery system, etc.). The relationships found are, however, regarded as typical for applications for heat recovery from exhaust gas from aluminium production based on prebaked electrode technology.

Although the present invention has been defined on the basis of prebake technology, the principles of the present invention may also be applied in connection with systems that use so-called Søderberg technology, and other industrial processes, exemplified by ferrosilicon smelting industry and waste incineration.

In the examples, tubes with circular and oval (elliptical) cross-sections have been mentioned. However, in other embodiments, it is possible to operate with an external geometry of the tubes where the tubes have been optimised with respect to particle deposition, heat transfer and pressure drop. For example, the cross-section of the tubes may principally be designed as a wing section.

Moreover, electrostatic or other similar methods may also be used to counteract deposit formation on the heat recovery equipment.

Further technical design adjustments can be carried out based upon the characteristics of the exhaust gas the heat shall be recovered from. This can by example involve the choice of material used in the recovery unit or its surface treatment, in particular in relation to recovering heat from humid or corrosive gases.

Further design adjustments with regard to the geometry of the recovery unit, the velocity of the exhaust gas at the surface thereof and other flow dependent issues can be carried out based upon the characterising features of the exhaust gas to be treated, such as gas velocities and temperatures. The density and the dimensions of the dust/particles in the exhaust gas may also be of importance with regard to the design of the heat recovery unit.

The invention claimed is:

1. A method for recovering heat from an exhaust gas which contains dust and/or particles and which is removed from an industrial process, the method comprising:
   providing the exhaust gas from production of aluminum in an electrolysis plant;
   providing equipment including:
   (i) a transport channel for conveying the exhaust gas containing dust and/or particles;
   (ii) a extraction/suction system for driving the exhaust gas through the transport channel; and
   (iii) a plurality of hollow elements for allowing a heat-recovery medium to flow therethrough, the hollow elements being disposed in the transport channel, and a longitudinal axis of the hollow elements being perpendicular to a direction of flow the exhaust gas;

providing the heat-recovery medium in the hollow elements;

driving the exhaust gas containing the dust and/or particles through the transport channel at a flow speed higher than 10 m/s and less than 25 m/s and with a temperature of 120° C. to 600° C. such that the exhaust gas is brought into contact with an outer surface of the hollow elements, the temperature at the outer surface of the hollow elements being above a temperature of approximately 70° C.;

conveying the exhaust gas through a gas cleaning plant, wherein the hollow elements are disposed upstream of the gas cleaning plant; and achieving a balance between particle deposition and particle removal on heat-transfer surfaces of the hollow elements, wherein after said achieving said balance between particle deposition and particle removal on heat-transfer surfaces of the hollow elements a fouling factor of the equipment is below 0.01 m²K/W, and further comprising cleaning the exhaust gas after the exhaust gas is brought into contact with the outer surface of the hollow elements, wherein the exhaust gas is raw gas from one or more electrolysis cells, wherein the exhaust gas is raw gas from production of aluminum in an electrolysis plant, wherein the hollow elements are enclosed by walls that form the transport channel, and the transport channel is coupled to the extraction/suction system, and wherein the hollow elements are disposed upstream of the extraction/suction system.

2. The method of claim 1, wherein the flow speed of the exhaust gas is 12 m/s.

3. The method of claim 1, wherein the heat-recovery medium is one of water, steam, and air.

4. The method of claim 1, wherein the hollow elements have circular cross-sections.

5. The method of claim 1, wherein the hollow elements have extended oval cross-section and the longitudinal axis of the cross-section is substantially coincident with the direction of flow of the exhaust gas.

6. The method of claim 1, wherein the hollow elements have ribs or fins for improved heat recovery.

7. The method of claim 1, wherein the hollow elements are made of galvanized carbon steel.

8. The method of claim 1, wherein said driving of exhaust gas is performed such that the flow speed of the exhaust gas passing over the hollow elements is maintained higher than approximately 11-13 m/s.

* * * * *